(12) United States Patent
Ikeya et al.

(10) Patent No.: US 12,051,892 B2
(45) Date of Patent: Jul. 30, 2024

(54) FASTENING STRUCTURE, ALUMINUM WIRING MATERIAL, AND METHOD OF MANUFACTURING FASTENING STRUCTURE

(71) Applicant: Yazaki Corporation, Tokyo (JP)

(72) Inventors: Hayato Ikeya, Shizuoka (JP); Rie Nakabayashi, Shizuoka (JP); Kazushige Tajima, Shizuoka (JP); Satoru Yoshinaga, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 330 days.

(21) Appl. No.: 17/679,329

(22) Filed: Feb. 24, 2022

(65) Prior Publication Data

US 2022/0278517 A1   Sep. 1, 2022

(30) Foreign Application Priority Data

Mar. 1, 2021   (JP) .................. 2021-032028

(51) Int. Cl.
*H02G 5/00*   (2006.01)
*F16B 33/00*   (2006.01)

(52) U.S. Cl.
CPC ............. *H02G 5/007* (2013.01); *F16B 33/00* (2013.01)

(58) Field of Classification Search
CPC ............ H01R 4/34; F16B 37/00; F16B 33/00; H02G 5/007
USPC ....................................................... 439/213
See application file for complete search history.

(56) References Cited

U.S. PATENT DOCUMENTS

| | | | | |
|---|---|---|---|---|
| 4,008,365 A * | 2/1977 | Carlson | .................... | H02G 5/08 174/68.2 |
| 4,804,804 A * | 2/1989 | Hibbert | .................. | H02G 5/007 174/68.2 |
| 4,849,581 A * | 7/1989 | Larkin | ................... | H02G 5/007 174/68.2 |
| 5,486,651 A * | 1/1996 | Morgan | ................. | H02G 5/007 174/68.2 |
| 5,785,542 A * | 7/1998 | Johnson | ................. | H02G 5/007 439/213 |
| 6,435,888 B1 * | 8/2002 | Reed, Jr. | ................... | H01R 4/30 174/88 B |
| 6,540,462 B1 * | 4/2003 | Bretschneider | ....... | F16B 37/005 411/301 |
| 8,540,526 B2 * | 9/2013 | Mooney | ................. | H02G 5/007 439/213 |
| 8,550,830 B1 * | 10/2013 | Bhathija | ................ | H01R 31/02 439/213 |

(Continued)

FOREIGN PATENT DOCUMENTS

| | | |
|---|---|---|
| JP | 2014-002977 A | 1/2014 |
| JP | 2017-188386 A | 10/2017 |
| WO | 2017/179650 A1 | 10/2017 |

*Primary Examiner* — Marcus E Harcum
(74) *Attorney, Agent, or Firm* — Sughrue Mion, PLLC

(57) ABSTRACT

A fastening structure includes a fastening member including a bolt and a plurality of fastened members that are fastened and fixed to the fastening member. Further, the bolt contains pure aluminum or an aluminum alloy. At least one fastened member of the plurality of fastened members contains pure aluminum or an aluminum alloy. Pure aluminum or an aluminum alloy of a screw portion of the bolt is brought into direct contact with pure aluminum or an aluminum alloy of at least one fastened member.

4 Claims, 7 Drawing Sheets

(56) References Cited

U.S. PATENT DOCUMENTS

| | | | |
|---|---|---|---|
| 8,587,916 B2* | 11/2013 | Yamakoshi | F16B 43/001 |
| | | | 361/218 |
| 9,705,300 B1* | 7/2017 | Maurer | H02G 5/007 |
| 9,887,477 B1* | 2/2018 | Reed | H01R 43/16 |
| 10,619,232 B2* | 4/2020 | Marien | C22F 1/08 |
| 2008/0063026 A1 | 3/2008 | Roche | |
| 2019/0103717 A1* | 4/2019 | Pever | H02G 5/007 |
| 2019/0131609 A1 | 5/2019 | Fukushima et al. | |
| 2019/0157851 A1 | 5/2019 | Okamoto et al. | |
| 2020/0067211 A1* | 2/2020 | Yamanaka | H01M 50/227 |

\* cited by examiner

FASTENING STRUCTURE, ALUMINUM WIRING MATERIAL, AND METHOD OF MANUFACTURING FASTENING STRUCTURE

CROSS REFERENCE TO RELATED APPLICATION

The present application is based on, and claims priority from the prior Japanese Patent Application No. 2021-032028, filed on Mar. 1, 2021, the entire contents of which are incorporated herein by reference.

TECHNICAL FIELD

The present disclosure relates to a fastening structure, an aluminum wiring material, and a method of manufacturing fastening structure.

BACKGROUND

Aluminum is light metal with satisfactory electric conductivity, and is relatively inexpensive. Thus, aluminum is used in an electric wire, a bus bar, an electrode, and the like in many cases. However, an oxide film is formed on an aluminum surface. Thus, in a case of pressure contact, a contact resistance of aluminum is 100 µΩ or greater, which is greater by one digit or more than a contact resistance of approximately a few µΩ to several ten µΩ of noble metal such as gold and silver, copper, or nickel, in general.

When an aluminum bus bar is used as a fastened member for bolt fastening, surface treatment (plating or surface roughness control) is performed in order to reduce a contact resistance of aluminum. JP 2014-002977 A discloses a method of reducing a contact resistance in the following manner. Specifically, in a case where a conductive member is pressed and contacted by an aluminum electric member or an aluminum alloy electric member, and is electrically coupled thereto, a tin-plated layer is formed on a contact surface with the electric member through intermediation of a barrier metal layer or an alloy metal layer.

SUMMARY

However, in this method of reducing a contact resistance of aluminum, a plating process is complicated, which causes a problem of increasing a manufacturing cost.

The present disclosure has been achieved in view of the above-mentioned problem in such a related-art. It is an object of the present disclosure to provide a fastening structure, an aluminum wiring material, and a method of manufacturing a fastening structure that achieve reduction of a contact resistance of aluminum without performing surface treatment such as plating even when aluminum is used for a fastened member for bolt fastening.

A fastening structure according to an aspect of the present disclosure includes a fastening member including a bolt and a plurality of fastened members that are fastened and fixed to the fastening member. The bolt contains pure aluminum or an aluminum alloy. At least one fastened member of the plurality of fastened members contains pure aluminum or an aluminum alloy. Pure aluminum or an aluminum alloy of a screw portion of the bolt is brought into direct contact with pure aluminum or an aluminum alloy of at least one fastened member.

A method of manufacturing a fastening structure according to an aspect of the present disclosure is a method of manufacturing a fastening structure that fastens and fixes a plurality of fastened members with a fastening member including a bolt. The method includes a step of fastening and fixing the plurality of fastened members with the fastening member so that a stress applied on a head seat surface of the bolt is 6 MPa or greater and 650 MPa or less and that a stress applied on a cross section along a screw shaft is 27 MPa or greater and 650 MPa or less. The bolt contains pure aluminum or an aluminum alloy. At least one fastened member of the plurality of fastened members contains pure aluminum or an aluminum alloy.

According to the present disclosure, there can be provided the fastening structure, the aluminum wiring material, and the method of manufacturing a fastening structure that achieve reduction of a contact resistance of aluminum without performing surface treatment such as plating even when aluminum is used for the fastened member for bolt fastening.

DETAILED DESCRIPTION

Figure 1:
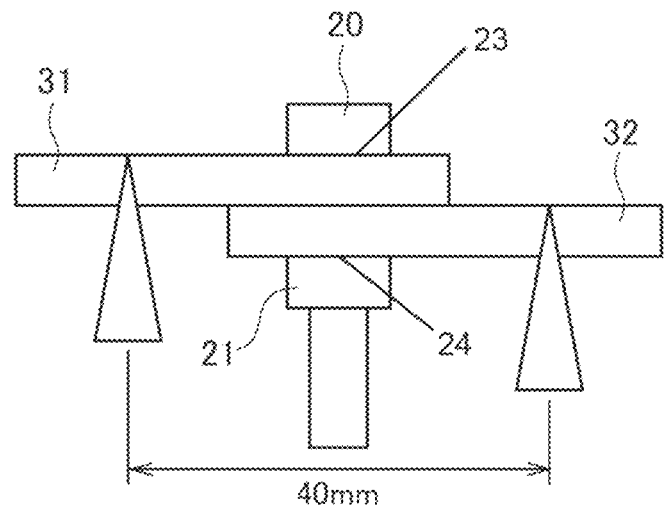
FIG. 1 is a schematic view illustrating a fastening member and fastened members of the present embodiment and illustrating a state in which the fastening member and the fastened members are fastened to each other to measure an electric resistance.

With reference to the drawings, a fastening structure according to the present embodiment is described in detail below. Note that dimensional ratios in the drawings are overdrawn for convenience of description, and may be different from actual dimensional ratios in some cases.

FIG. 1 illustrates the fastening structure according to the present embodiment. The fastening structure includes a fastening member including a bolt 20 and a plurality of fastened members that are fastened and fixed to the fastening member. The fastening member includes the bolt 20, and the bolt 20 contains pure aluminum or an aluminum alloy.

The aluminum alloy contained in the bolt 20 may contain at least one element selected from a group consisting of Si, Fe, Cu, Mn, Mg, Cr, Zn, and Ti, in addition to raw material aluminum such as an aluminum ingot. The aluminum alloy contains at least one element selected from the group consisting of Si, Fe, Cu, Mn, Mg, Cr, Zn, and Ti, and the rest may be aluminum and inevitable impurities.

As the aluminum ingot, pure aluminum having purity of 99.7 mass % or greater is preferably used. Note that, in the present embodiment, examples of the aluminum ingot include, among pure aluminum ingots specified in Japanese Industrial Standards JIS H2102:2011 (aluminum ingots), an aluminum ingot having purity of 99.7 mass % or greater in Class I, an aluminum ingot having purity of 99.85 mass % or greater in Special Class II, and an aluminum ingot having purity of 99.90 mass % or greater in Special Class I. In the present embodiment, the aluminum ingot is not limited to expensive and highly pure ingots such as Special Class I and Special Class II, but an aluminum ingot in Class I that, which is relatively inexpensive, can be used.

0.1 mass % or greater and less than 1.2 mass %, preferably, 0.3 mass % to 0.7 mass % of Si is contained in the aluminum alloy. 0.1 mass % or greater or less than 1.7 mass %, preferably, 0.4 mass % to 0.7 mass % of Fe is contained in the aluminum alloy.

0.04 mass % to 7 mass %, preferably, 0.1 mass % to 2.6 mass % of Cu is contained in the aluminum alloy. 0.03 mass % to 0.8 mass %, preferably, 0.03 mass % to 0.1 mass % of Mn is contained in the aluminum alloy. 0.03 mass % to 4.5 mass %, preferably, 0.35 mass % to 0.8 mass % of Mg is contained in the aluminum alloy. 0.03 mass % to 0.35 mass %, preferably, 0.03 mass % to 0.1 mass % of Cr is contained in the aluminum alloy. 0.04 mass % to 7.0 mass %, preferably, 0.1 mass % to 0.25 mass % of Zn is contained in the aluminum alloy. 0.00 mass % to 0.2 mass %, preferably, 0.00 mass % to 0.1 mass % of Ti is contained in the aluminum alloy.

Aluminum may contain an infinitesimal amount of inevitable impurities. Examples of inevitable impurities that are possibly contained in aluminum include nickel (Ni), rubidium (Pb), tin (Sn), vanadium (V), gallium (Ga), boron (B), sodium (Na), and zirconium (Zr). Those impurities are contained inevitably within such a range that the effects of the present embodiment are not hindered and properties of the aluminum alloy of the present embodiment are not particularly affected. Further, elements that are originally contained in the aluminum ingot to be used are also regarded as inevitable impurities. A total amount of the inevitable impurities in the aluminum alloy is preferably 0.07 mass % or less, more preferably, 0.05 mass % or less.

Even when only the bolt 20 is used as the fastening member, the fastening structure can be achieved. However, in view of an effect of removing an oxide film described later, as illustrated in FIG. 1, the fastening member preferably includes a nut 21. The bolt 20 is screwed into the nut 21, and the nut 21 preferably contains pure aluminum or an aluminum alloy. Examples of pure aluminum or an aluminum alloy contained in the nut 21 include the same materials as pure aluminum or an aluminum alloy contained in the bolt 20.

The fastened member includes a bus bars. The bus bar is formed to have a flat plate-like shape, and a hole portion is provided through the fastened member so that a screw portion of the bolt 20 can be inserted into the hole portion. As illustrated in FIG. 1, the plurality of fastened members include an upper bus bar 31 and a lower bus bar 32. Further, under a state in which the screw portion of the bolt 20 is inserted into the hole portion provided in the fastened member, the nut 21 is fastened to the screw portion. With this, the upper bus bar 31 and the lower bus bar 32 are fastened and fixed.

At least one fastened member of the plurality of fastened members contains pure aluminum or an aluminum alloy. Examples of pure aluminum or an aluminum alloy contained in the fastened member include the same materials as pure aluminum or an aluminum alloy contained in the bolt 20.

In the fastened state in FIG. 1, an axial force of the bolt 20 acts on the fastened members that are fastened and fixed by the bolt 20 and the nut 21. Further, a frictional force in a surface direction acts between a head seat surface of the bolt 20 and a surface of the upper bus bar 31, which is brought into contact with the seat surface. This is represented as reference numeral 23 in FIG. 1. Further, a frictional force in a surface direction also acts between a seat surface of the nut 21 and a surface of the lower bus bar 32, which is brought into contact with the seat surface. This is represented as reference numeral 24 in FIG. 1. Further, a frictional force also acts between the screw portion of the bolt 20, and the upper bus bar 31 and the lower bus bar 32.

Here, the axial force of the bolt 20 can be calculated based on Motosh equation as in Calculation Formula (1) given below.

$$T=F/2((d_2/\cos \alpha)\mu_s+P/\pi+d_w\mu_w) \quad (1)$$

In Calculation Formula (1) given above, T indicates a tightening torque (N·m), F indicates an axial force (N), $d_2$ indicates an effective diameter of a screw shaft (mm), α indicates a semi-angle of a thread (degree), $\mu_s$ indicates a frictional coefficient of a screw surface, P indicates a pitch of a thread (mm), $d_w$ indicates an equivalent friction diameter (mm), and $\mu_W$ indicates a bolt seat surface frictional coefficient.

Further, a method of manufacturing a fastening structure preferably includes a step of fastening and fixing the fastened members with the bolt 20 so that a stress received on the bolt head seat surface of the bolt 20 from the axial force of the bolt 20 is 6 MPa or greater and 650 MPa or less. The stress on the bolt head seat surface indicates a stress obtained by dividing the axial force by the seat surface area of the bolt 20. When the stress on the bolt head seat surface of the bolt 20 is 6 MPa or greater, an effect of reducing a contact resistance can be improved. Further, when the stress on the bolt head seat surface of the bolt 20 is 650 MPa or less, a stable fastening state can be maintained without exceeding a maximum bearing force of aluminum.

The method of manufacturing a fastening structure preferably includes a step of fastening and fixing the fastened members with the bolt 20 so that a stress received on the cross section of the screw shaft from the axial force of the bolt 20 is 27 MPa or greater and 650 MPa or less. The stress received on the cross section of the screw shaft indicates a stress obtained by dividing the axial force by a cross-sectional area of the screw shaft, which is obtained by the effective diameter of the bolt 20. When the stress received on the cross section of the screw shaft is 27 MPa or greater, an effect of reducing a contact resistance can be improved. Further, when the stress received on the cross section of the screw shaft is 650 MPa or less, a stable fastening state can be maintained without exceeding a maximum bearing force of aluminum.

In general, an oxide film ($Al_2O_3$) having a film thickness of approximately several nm to several tens nm is firmly present on an aluminum surface. This is a main cause that increases a contact resistance of aluminum. However, due to the frictional force generated by using the bolt 20 and fastening the fastened members, plastic flow of the head seat surface of the bolt 20, the screw portion of the bolt 20, and the surface of the bus bar is caused. With this, an oxide film is removed. As a result, pure aluminum or an aluminum alloy in the head seat surface and the screw portion of the bolt 20 is brought into direct contact with pure aluminum or an aluminum alloy of at least one fastened member, and hence a contact resistance of aluminum is reduced. In this state, it is only required that the bolt 20 and the fastened member be partially brought into contact with each other without intermediation of an oxide film.

The fastening member may further include the nut 21 containing pure aluminum or an aluminum alloy. Further, pure aluminum or an aluminum alloy of the head seat surface of the bolt 20 may be brought into direct contact with pure aluminum or an aluminum alloy of at least one fastened member. Further, pure aluminum or an aluminum alloy of the seat surface of the nut 21 may be brought into direct contact with pure aluminum or an aluminum alloy of at least one fastened member. With this, a contact resistance of aluminum is further reduced.

When steel is used for the bolt 20 or the fastened members to fasten the fastened members, a frictional force is also generated. However, a frictional coefficient between aluminum and steel is less than a frictional coefficient between aluminum and aluminum, and hence an effect of removing an oxide film is small. Further, a contact resistance between aluminum and steel and a volume resistance of steel are greater than a volume resistance of aluminum. In view of this, the bolt 20 and at least one fastened member contain pure aluminum or an aluminum alloy in order to enhance an effect of reducing a contact resistance.

In order to reduce a contact resistance to a further extent, optimization of a size of a screw hole of a bus bar being the fastened member and a screw shape of the bolt 20 can be conceived. Specifically, an aluminum bus bar is subjected to screw hole machining without performing surface treatment such as plating treatment, and is fastened with an aluminum bolt and an aluminum nut. With this, a resistance at the same level as a contact resistance obtained at the time of using a copper bus bar can be achieved.

An aluminum wiring material of the present embodiment includes the fastening structure, and is used for, for example, a wire harness of an automobile. Thus, without performing plating treatment on an aluminum surface used for the aluminum wiring material, an electric resistance can be reduced, and increase in plating cost can be suppressed. Further, fastening is achieved by a bolt and a nut, which facilitates disassembly. In view of metal recycling, separation is facilitated.

The fastening structure, the aluminum wiring material, and the method of manufacturing a fastening structure according to the present embodiment are described above. The present embodiment is not limited to the embodiment described above. For example, when an aluminum-carbon nanotube composite material, which has an excellent stress relaxation resistance property or an excellent creep resistance property, is used for part of the fastening structure, it is possible to provide an aluminum fastening structure for electric coupling, which can be used under a stress loading state in a high-temperature environment. The material has little change in physical properties, and hence aluminum can be used even at a heat generation part such as a vicinity of an engine unit or a battery of an automobile. This can contribute to reduction in component weight. Further, at least one selected from a group consisting of the bolt 20, the nut 21, and the fastened members may contain dispersion-strengthened type aluminum group combined metal in which particles such as inorganic substances are dispersed in pure aluminum or an aluminum alloy.

EXAMPLES

The present embodiment is further described below in detail with Examples and Comparative Examples. However, the present embodiment is not limited to those examples.
[Preparation of Samples]
As the fastening member, a bolt formed of the following materials was prepared.
Aluminum: A6056-T6 aluminum alloy
Steel: Carbon Steel Wire for Cold Heading and Cold Forging (SWCH) without surface treatment
As the fastening member, a nut formed of the following materials was prepared.
Aluminum: A7075-T6 aluminum alloy
Steel: SWCH without surface treatment
As the fastened member, a bus bar formed of the following materials was prepared.
Aluminum: A6061-T6 aluminum alloy
Copper: C1020 oxygen-free copper
[Evaluation]
The test samples in Examples and Comparative examples were evaluated according to the following method.
(Measurement of Electric Resistance)
As in FIG. 1, the bolt 20, the nut 21, the upper bus bar 31, and the lower bus bar 32 were used, and a tightening torque of the bolt 20 was changed. In this manner, an electric resistance between the upper bus bar 31 and the lower bus bar 32 was measured. Specifically, RM3548 available from HIOKI E.E. CORPORATION was used, and an electric resistance was measured at a position at which a distance between terminals was 40 mm across the fastening portion between the bolt 20 and the nut 21, and the two bus bars, according to a four-terminal method.
(Calculation of Stress Applied on Cross Section of Screw Axis)
Calculation Formula (1) given above was used to calculate the axial force F from the tightening torque T. Note that the effective diameter of the screw shaft $d_2$ was 5.351 mm, the semi-angle $\alpha$ of the thread was 0.524 degrees, the frictional coefficient $\mu_s$ of the screw surface was a value shown in Table 1, the pitch P of the thread was 1.000 mm, the equivalent friction diameter $d_w$ was 10.074 mm, and the bolt seat surface frictional coefficient $\mu_w$ was a value shown in Table 1. Note that an M6 bolt having a screw nominal diameter of 6 mm was used as the bolt 20.

TABLE 1

| Upper bus bar | Lower bus bar | Bolt | Nut | Frictional coefficient on screw surface $\mu_s$ | Frictional coefficient on bolt seat surface $\mu_w$ |
|---|---|---|---|---|---|
| Cu | Cu | Steel | Steel | 0.25 | 0.4 |
| Al alloy | Al alloy | | | 0.25 | 0.36 |
| Al alloy | Cu | | | 0.25 | 0.36 |
| Cu | Al alloy | | | 0.25 | 0.4 |
| Al alloy | Al alloy | Al | Al | 0.25 | 0.8 |

Examples 1 to 5

The evaluation results are shown in Table 2. In Examples 1 to 5, an aluminum alloy was used for a bolt and a nut, and an aluminum alloy was used for a bus bar.

Comparative Examples 1 to 10

Meanwhile, in Comparative Examples 1 to 5, steel was used for a bolt and a nut, and an aluminum alloy was used for a bus bar similarly to Examples 1 to 5. Further, in Comparative Examples 6 to 10, steel was used for a bolt and a nut similarly to Comparative Examples 1 to 5, and copper was used for a bus bar.

TABLE 2

| | | Material of bolt and nut | Material of bus bar | Torque [N · m] | Electric Resistance [mΩ] | Axial force [N] | Stress applied on head seat surface [MPa] | Stress applied on bolt cross section along screw shaft [MPa] |
|---|---|---|---|---|---|---|---|---|
| Examples | 1 | Al alloy | Al—Al | 1.01 | 0.1388 | 203 | 2.0 | 9.0 |
| | 2 | | | 3.04 | 0.0631 | 610 | 6.1 | 27.1 |
| | 3 | | | 5.06 | 0.0529 | 1016 | 10.1 | 45.2 |
| | 4 | | | 7.10 | 0.0437 | 1426 | 14.2 | 63.4 |
| | 5 | | | 9.32 | 0.0383 | 1871 | 18.6 | 83.2 |
| Comparative Examples | 1 | Steel | | 1.03 | 0.2852 | 365 | 3.1 | 16.2 |
| | 2 | | | 3.08 | 0.1407 | 1092 | 9.3 | 48.6 |
| | 3 | | | 5.13 | 0.1506 | 1819 | 15.5 | 80.9 |
| | 4 | | | 7.15 | 0.1052 | 2535 | 21.6 | 112.7 |
| | 5 | | | 9.38 | 0.6560 | 3326 | 28.3 | 147.9 |
| | 6 | | Cu—Cu | 1.14 | 0.0640 | 373 | 3.2 | 14.7 |
| | 7 | | | 3.05 | 0.0237 | 997 | 8.5 | 43.7 |
| | 8 | | | 5.10 | 0.0345 | 1667 | 14.2 | 72.7 |
| | 9 | | | 7.08 | 0.0242 | 2314 | 19.7 | 101.9 |
| | 10 | | | 9.07 | 0.0254 | 2964 | 25.2 | 132.5 |

Figure 2:
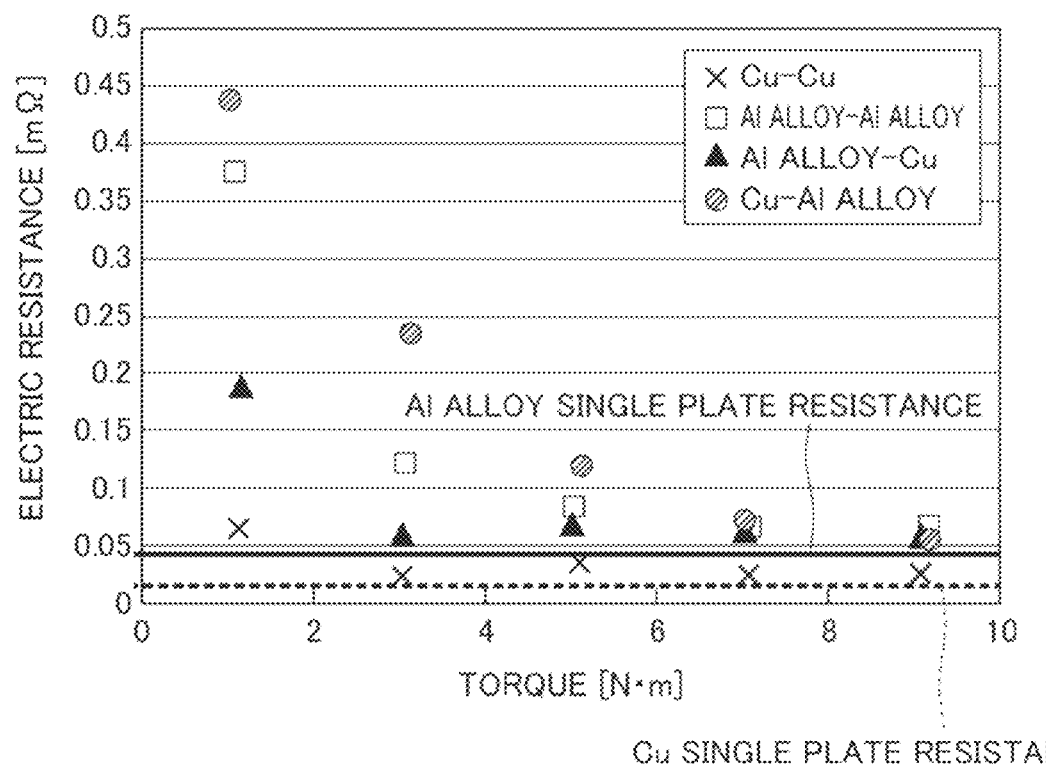
FIG. 2 is a graph illustrating a relationship between a tightening torque and an electric resistance through fastening between a steel bolt and a steel nut.

FIG. 2 and Table 3 are graphs for comparison on a relationship between a tightening torque of the fastening member and an electric resistance through fastening between a steel bolt and a steel nut while changing kinds and combinations of two bus bars. Four kinds of combinations of bus bars included copper-copper, aluminum alloy-aluminum alloy, aluminum alloy-copper, and copper-aluminum alloy in the order of the upper bus bar and the lower bus bar. As a result, as a tightening torque was increased, an electric resistance was reduced. Further, with regard to each tightening torque, an electric resistance at the time of using the two copper bus bars had the minimum value, and an electric resistance at the time of using an aluminum alloy bus bar for one of the two bus bars and the two aluminum alloy bus bars was likely to increase. An oxide film on the aluminum alloy bus bar was regarded as a cause that increased a contact resistance.

TABLE 3

| Cu—Cu | | Al alloy-Al alloy | | Al alloy-Cu | | Cu—Al alloy | |
|---|---|---|---|---|---|---|---|
| Torque [N · m] | Electric Resistance [mΩ] | Torque [N · m] | Electric Resistance [mΩ] | Torque [N · m] | Electric Resistance [mΩ] | Torque [N · m] | Electric Resistance [mΩ] |
| 1.14 | 0.064 | 1.08 | 0.3753 | 1.17 | 0.1875 | 1.03 | 0.4373 |
| 3.05 | 0.0237 | 3.07 | 0.1209 | 3.05 | 0.0596 | 3.13 | 0.2351 |
| 5.1 | 0.0345 | 5.04 | 0.0832 | 5.01 | 0.0683 | 5.12 | 0.1191 |
| 7.08 | 0.0242 | 7.08 | 0.0663 | 7.03 | 0.0611 | 7.02 | 0.0718 |
| 9.07 | 0.0254 | 9.16 | 0.0656 | 9.07 | 0.0574 | 9.18 | 0.0548 |

Figure 3:
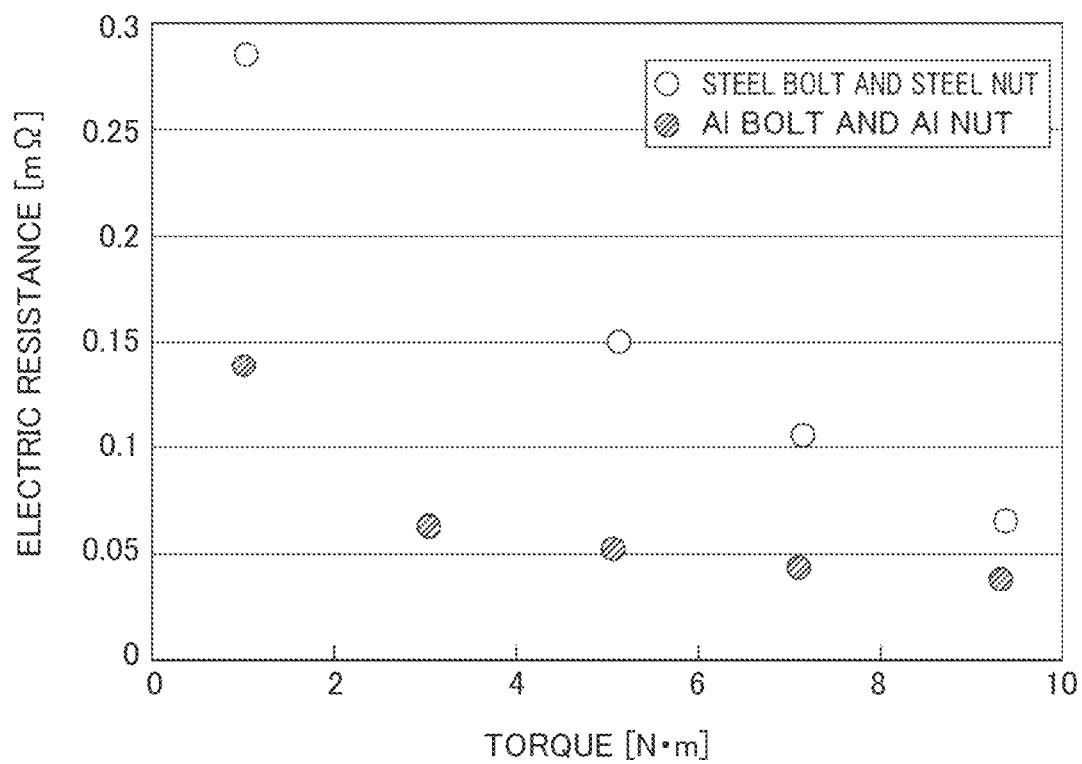
FIG. 3 is a graph illustrating a relationship between a tightening torque and an electric resistance through fastening between an aluminum bolt and an aluminum nut or fastening between a steel bolt and a steel nut.

FIG. 3 is a graph for comparison on a relationship between a tightening torque and an electric resistance through fastening between an aluminum bolt and an aluminum nut or fastening between a steel bolt and a steel nut when two aluminum alloy bus bars used as the fastened members. With regard to any tightening torque, an electric resistance through fastening between the aluminum bolt and the aluminum steel nut was smaller than an electric resistance through fastening between the steel bolt and the steel nut. This indicates that the aluminum bolt and the aluminum nut effectively contribute as conductive paths and that the head seat surface and the screw portion of the bolt, and the bus bars were electrically coupled to each other. Further, this indicates that oxide films on the head seat surface and the screw portion of the bolt were removed through fastening of the bolt and that an aluminum alloy contained in the head seat surface and the screw portion of the bolt was brought into direct contact with an aluminum alloy of the bus bars. Further, a frictional coefficient between aluminum and aluminum is greater than a frictional coefficient between aluminum and steel, which indicates that an effect of removing an oxide film is enhanced more through fastening between an aluminum bolt and an aluminum nut.

Figure 4A:
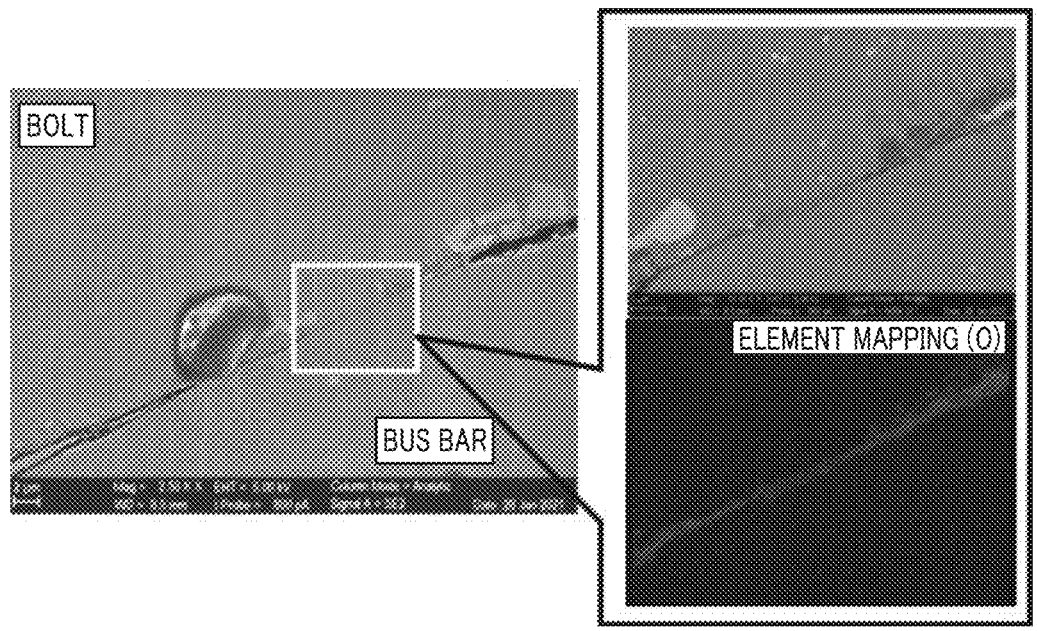
FIG. 4A is a scanning electron microscope (SEM) photograph illustrating an aluminum oxide film remains at a boundary surface between an aluminum bolt and an aluminum bus bar.
Figure 4B:
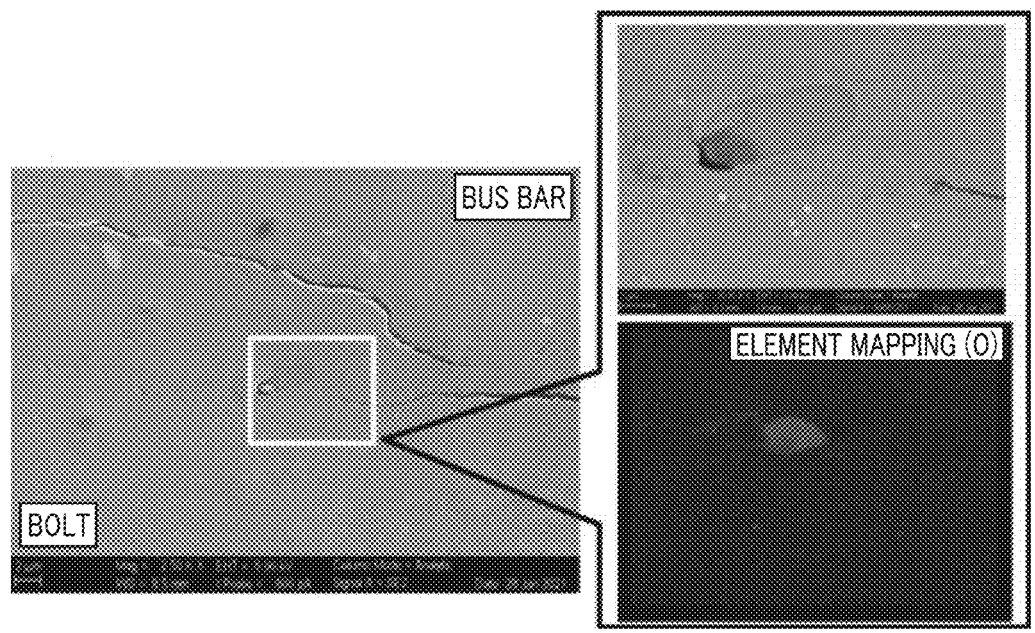
FIG. 4B is an SEM photograph illustrating that newly formed surfaces are brought into contact with each other after removing the oxide film at the boundary surface between the aluminum bolt and the aluminum bus bar.

FIG. 4A and FIG. 4B illustrate results obtained by performing an element analysis on a boundary surface of a fastening portion between an aluminum bolt and an aluminum alloy bus bar. Oxygen was detected from a bolt-bus bar boundary surface illustrated in FIG. 4A, which indicates that an oxide film was present on the surfaces of the aluminum bolt and the aluminum alloy bus bar. This oxide film would increase a contact resistance. Meanwhile, it was observed that a boundary surface illustrated in FIG. 4B had a part from which oxygen was not detected. This indicates that a surface oxide film was removed and that newly-formed surfaces were brought into contact with each other. Thus, a contact resistance was reduced.

Figure 5A:
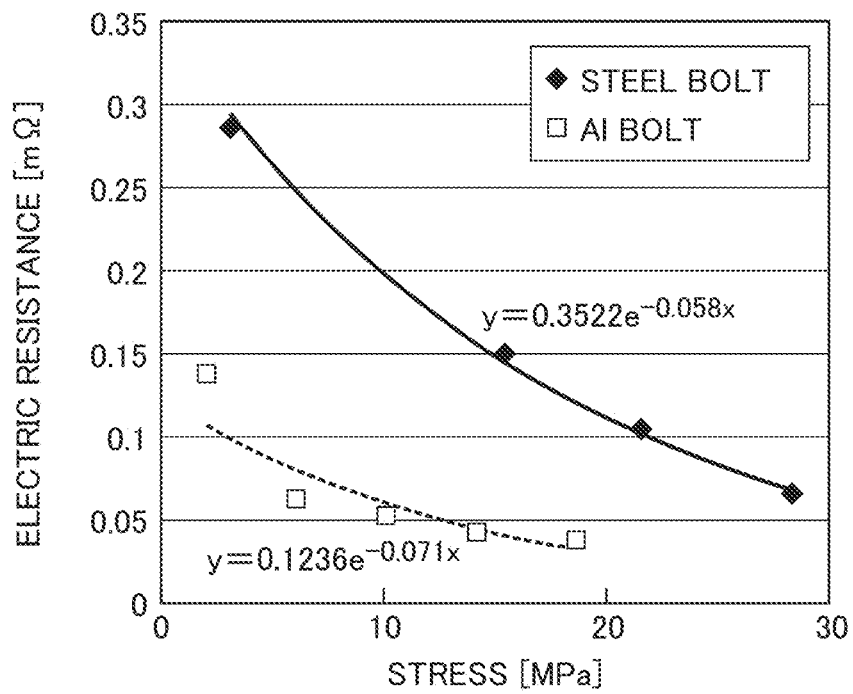
FIG. 5A is a graph illustrating a relationship between a stress applied on a bolt head seat surface and an electric resistance.
Figure 5B:
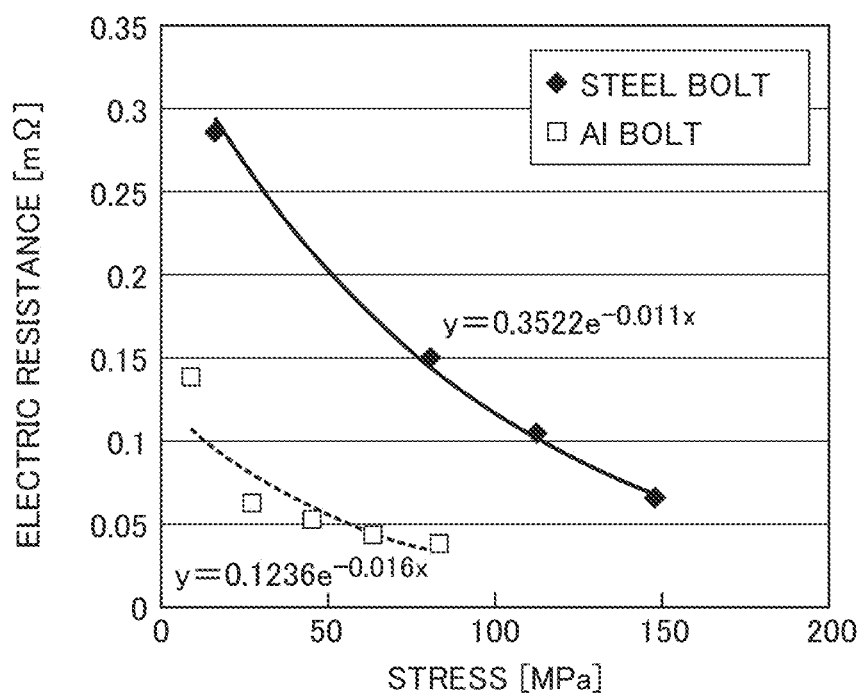
FIG. 5B is a graph illustrating a relationship between a stress applied on a cross section along a screw shaft and an electric resistance.

FIG. 5A is a graph illustrating a relationship between a stress applied on a bolt head seat surface and an electric resistance when two aluminum alloy bus bars were used as the fastened members. Further, FIG. 5B is a graph illustrating a relationship between a stress applied on a cross section along a screw shaft and an electric resistance when two aluminum alloy bus bars were used as the fastened members. A relationship between a stress and an electric resistance can be organized in approximate expressions given in FIG. 5A and FIG. 5B, respectively. With regard to any stress, an electric resistance through fastening between the aluminum bolt and the aluminum nut was smaller than an electric resistance through fastening between the steel bolt and the steel nut. This indicates that oxide films on the head seat surface and the screw portion of the bolt were removed through fastening of the bolt and that an aluminum alloy contained in the head seat surface and the screw portion of the bolt was brought into direct contact with an aluminum alloy of the bus bars. Further, a frictional coefficient between aluminum and aluminum is greater than a frictional coefficient between aluminum and steel, which indicates that an effect of removing an oxide film is enhanced more through fastening between an aluminum bolt and an aluminum nut.

Figure 6:
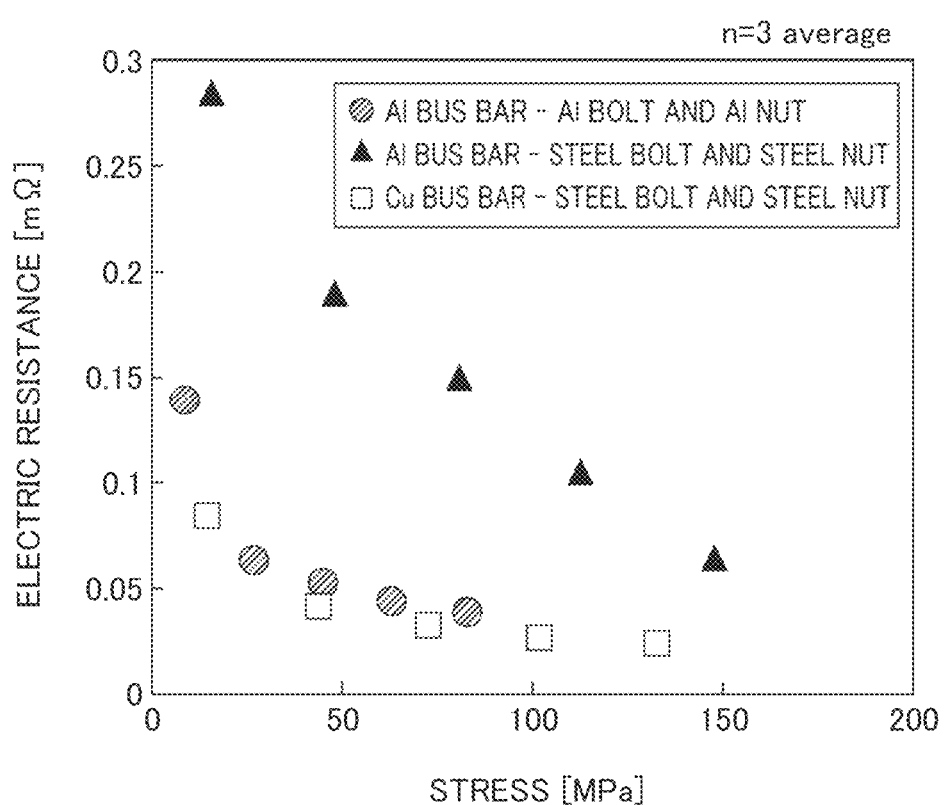
FIG. 6 is a graph illustrating a relationship between a stress applied on a cross section along a screw shaft and an electric resistance.

FIG. 6 is a graph illustrating a relationship between a stress received on a cross section of a screw shaft and an electric resistance through fastening between an aluminum bolt and an aluminum nut or fastening through a steel bolt and a steel nut when two aluminum alloy bus bars were used as the fastened members. Further, FIG. 6 is a graph illustrating a relationship between a stress received on a cross section of a screw shaft and an electric resistance through fastening between a steel bolt and a steel nut when two copper bus bars were used as the fastened members. Along with increase in stress received on the cross section of the screw shaft, an electric resistance of the aluminum alloy bus bars through fastening the aluminum bolt and the aluminum nut was reduced to an extent equivalent to an electric resistance of the copper bus bars through fastening the steel bolt and the steel nut. Specifically, this indicates that, when an aluminum bolt and an aluminum nut are used for fastening of aluminum alloy bus bars, a resistance, which is at a level equivalent to a constant resistant at the time of using copper bus bars, can be achieved without performing surface treatment such as plating treatment.

Figure 7A:
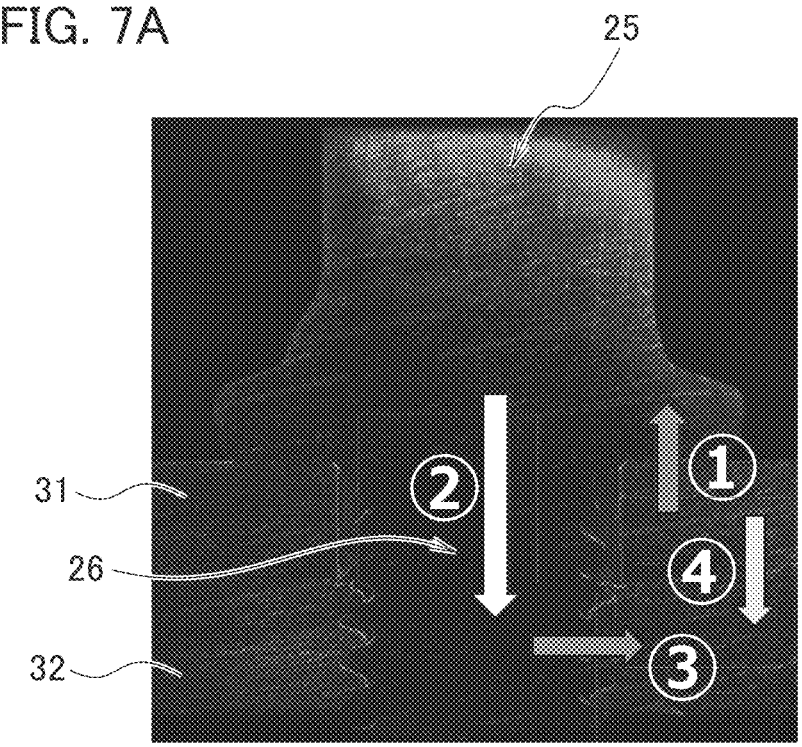
FIG. 7A is a microscopic image illustrating a cross section under a state in which an aluminum alloy bus bar and an aluminum bolt are fastened with each other, in an enlarged manner.
Figure 7B:
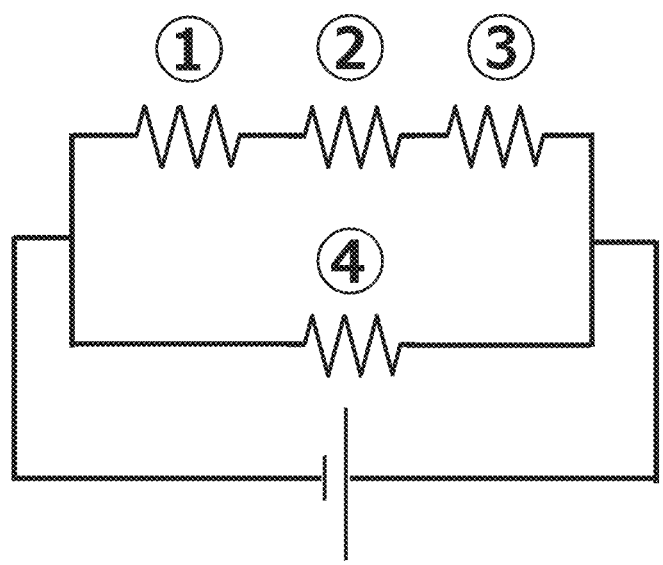
FIG. 7B is an electric circuit diagram assumed under the state in FIG. 7A.

FIG. 7A is a microscopic image illustrating a cross section observed after fastening two aluminum alloy bus bars with an aluminum bolt. A head portion 25 of the bolt was brought into contact with the upper bus bar 31, and a screw portion 26 of the bolt was brought into contact with the upper bus bar 31 and the lower bus bar 32. Further, FIG. 7B is an electric circuit diagram assumed under the state in FIG. 7A, and the reference numerals 1 to 4 in FIG. 7A and FIG. 7B correspond to each other respectively. As paths through which an electron flew, a path flowing from the upper bus bar 31 to the head portion 25 of the bolt, then from an upper part of the screw portion 26 of the bolt to a lower part thereof, and finally to the lower bus bar 32 and a direct path from the upper bus bar 31 to the lower bus bar 32 were assumed.

Figure 8A:
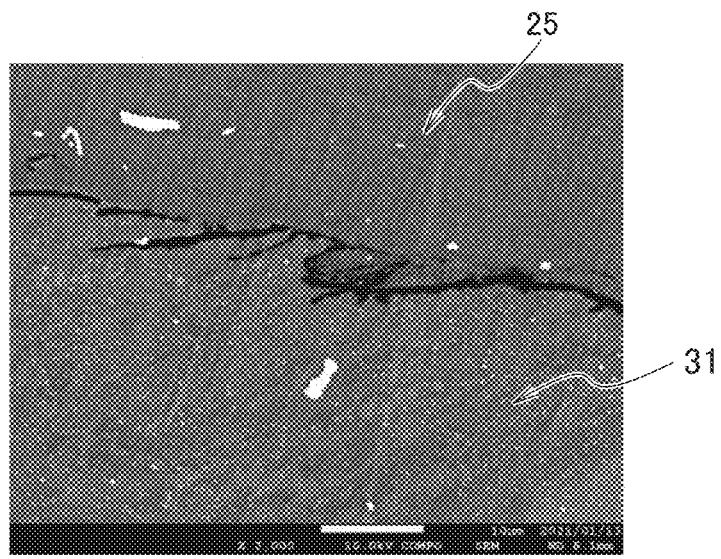
FIG. 8A is an SEM photograph illustrating a boundary surface between an aluminum alloy bus bar and a head of an aluminum bolt.
Figure 8B:
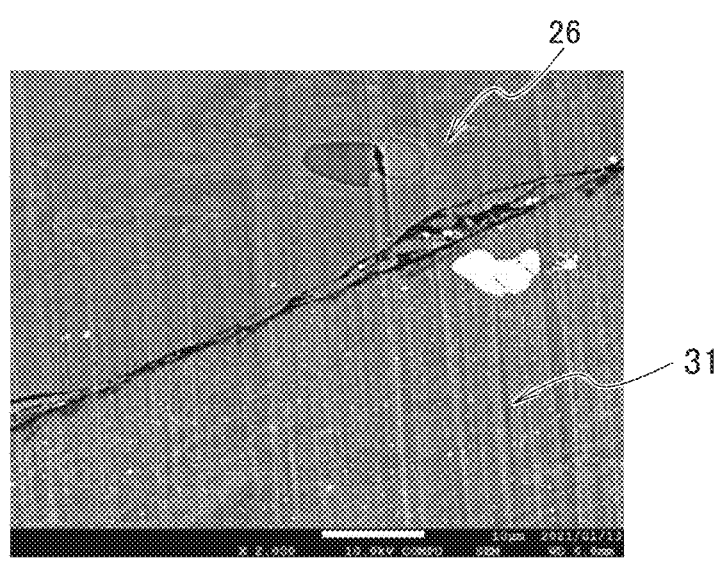
FIG. 8B is an SEM photograph illustrating a boundary surface between an aluminum alloy bus bar and a screw portion of an aluminum bolt.

FIG. 8A illustrates a result obtained by observing a boundary surface between the upper bus bar 31 and the head portion 25 of the bolt, along a cross section under a state in which the aluminum alloy bus bars and the aluminum bolt that were observed in FIG. 7A were fastened to each other. Further, FIG. 8B illustrates a result obtained by observing a boundary surface between the upper bus bar 31 and the screw portion 26 of the bolt, along a cross section under a state in which the aluminum alloy bus bars and the aluminum bolt that were observed in FIG. 7A were fastened to each other. At each of the boundary surfaces observed in FIG. 8A and FIG. 8B, a state in which aluminum on the aluminum bolt side entered aluminum on the bus bar side and was deformed was observed. This indicates that an oxide film was removed by plastic flow generated on the seat surface of the head portion 25 of the bolt, the surface of the screw portion 26 of the bolt, and the surface of the upper bus bar 31 due to a frictional force generated at the time of bolt fastening.

The present embodiment is described above with Examples and Comparative Examples. The present embodiment is not limited thereto, and various modifications can be made within the scope of the present embodiment.

What is claimed is:

1. A fastening structure, comprising:
   a fastening member including a bolt; and
   a plurality of fastened members being fastened and fixed to the fastening member, wherein
   the bolt contains pure aluminum or an aluminum alloy,
   at least one fastened member of the plurality of fastened members is a bus bar that contains pure aluminum or an aluminum alloy,
   pure aluminum or an aluminum alloy of a screw portion of the bolt is brought into direct contact with pure aluminum or an aluminum alloy of the at least one fastened member,
   the bolt and the at least one fastened member are partially brought into contact with each other without intermediation of an oxide film, and
   due to a frictional force generated by using the bolt and fastening the at least one fastened member, plastic flow of a head seat surface of the bolt, the screw portion of the bolt, and a surface of the bus bar is caused and the oxide film is removed.

2. The fastening structure according to claim 1, wherein
   the fastening member further includes a nut containing pure aluminum or an aluminum alloy,
   pure aluminum or an aluminum alloy of the head seat surface of the bolt is brought into direct contact with pure aluminum or an aluminum alloy of the at least one fastened member, and
   pure aluminum or an aluminum alloy of a seat surface of the nut is brought into direct contact with pure aluminum or an aluminum alloy of the at least one fastened member.

3. An aluminum wiring material, comprising:
   the fastening structure according to claim 1.

4. A method of manufacturing a fastening structure configured to fasten and fix a plurality of fastened members with a fastening member including a bolt, the method comprising:
   a step of fastening and fixing the plurality of fastened members with the fastening member so that a stress applied on a head seat surface of the bolt is 6 MPa or greater and 650 MPa or less and that a stress applied on a cross section along a screw shaft is 27 MPa or greater and 650 MPa or less, wherein
   the bolt contains pure aluminum or an aluminum alloy,
   at least one fastened member of the plurality of fastened members is a bus bar that contains pure aluminum or an aluminum alloy,
   during the fastening and fixing of the plurality of fastened members with the fastening member, the method further comprises:
      bringing a screw portion of the bolt containing pure aluminum or aluminum alloy into direct contact with the at least one fastened member of the plurality of fastened members containing pure aluminum or an aluminum alloy; and
      bringing the bolt and the at least one fastened member into contact with each other without intermediation of an oxide film, and due to a frictional force generated by using the bolt and fastening the at least one fastened member, plastic flow of the head seat surface of the bolt, the screw portion of the bolt, and a surface of the bus bar is caused and the oxide film is removed.

* * * * *